(No Model.)
D. S. MUNGER.
HITCHING DEVICE FOR VEHICLES.
No. 316,996. Patented May 5, 1885.
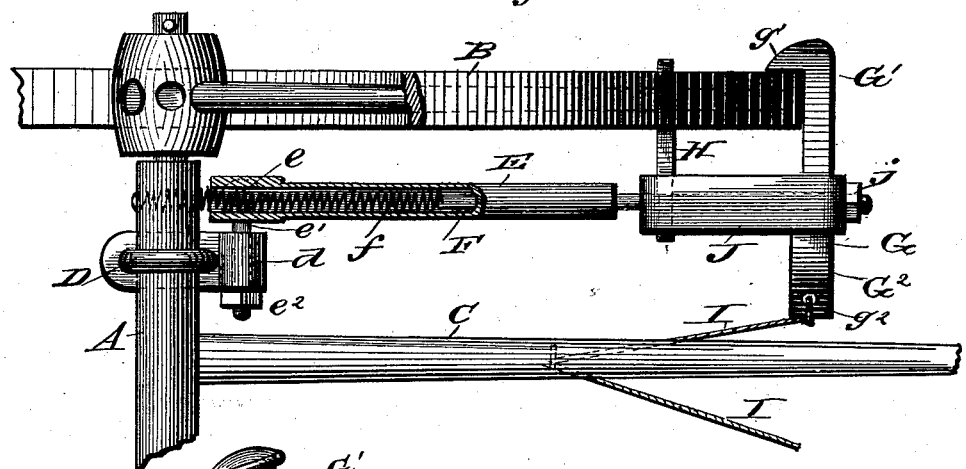
Fig. 1.
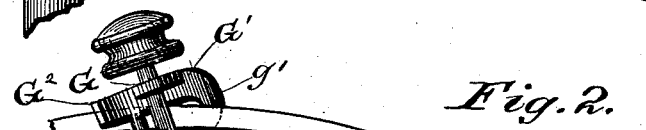
Fig. 2.
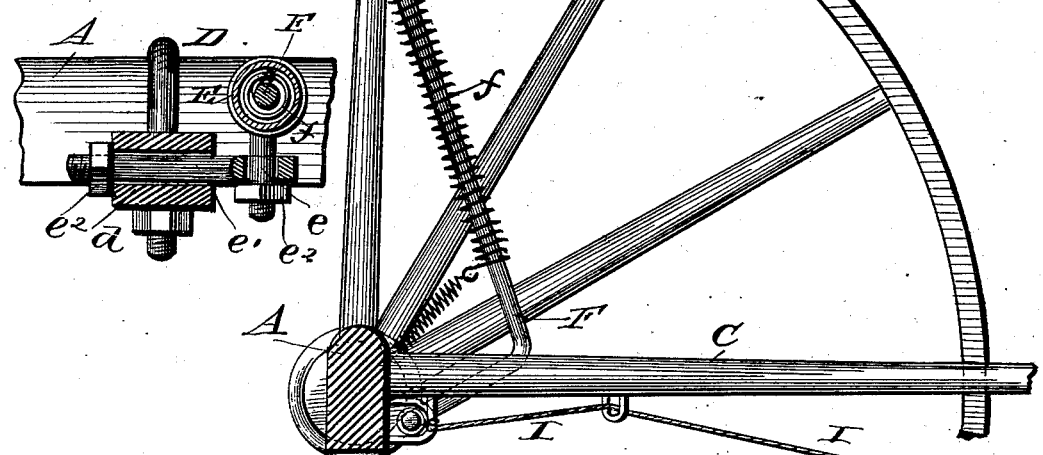
Fig. 3.
Fig. 4.
WITNESSES
Phil C. Dietrich
F. O. McCleary
INVENTOR
D. S. Munger
By Joule & Co.
Attys
N. PETERS. Photo-Lithographer, Washington, D. C.

UNITED STATES PATENT OFFICE.

DEXTER S. MUNGER, OF STONEHAM, MASSACHUSETTS.

HITCHING DEVICE FOR VEHICLES.

SPECIFICATION forming part of Letters Patent No. 316,996, dated May 5, 1885.

Application filed December 29, 1884. (No model.)

*To all whom it may concern:*

Be it known that I, DEXTER S. MUNGER, a citizen of the United States, residing at Stoneham, in the county of Middlesex and State of Massachusetts, have invented certain new and useful Improvements in Wheel-Hitches; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to a hitching device for horses adapted to be applied to the axle of a vehicle to engage one of the wheels thereof.

The invention consists in combining with the axle and wheel of a vehicle a check device adapted to grip upon the tire of the wheel and provided with a rein attached to the bridle-ring of the harness.

The invention further consists in the features of construction and combinations of devices hereinafter fully described, and pointed out in the claims.

In the drawings, Figure 1 represents a plan view of a portion of an axle and wheel having my improvement applied thereto. Fig. 2 is a modification, and Figs. 3 and 4 illustrate parts in detail.

A represents an axle having the wheel B mounted thereon and a shaft, C, secured thereto.

D represents a clip secured upon the axle between the shaft and wheels and formed with an eye, $d$.

The hitching or check device consists of a tube or sleeve, E, formed with an arm, $e$, at its rear end, which latter is secured by means of an eyebolt, $e'$, and nuts $e^2$ to the clip D, a spring-rod, F, a gripping-arm, G', a pawl-lever, H, and check-rein I.

The rod F is arranged within tube E, and is provided at its rear end with a spring, $f$, which is secured at one end to the rod F and at its other end to the axle.

J represents a bracket formed with openings to receive the rod F, to which it is secured by the nut $j$ at the forward end of the rod.

G represents the T-shaped gripping device, secured to the bracket J, provided with a perforated lug, $g$, between which and the bracket upon the rod F is pivoted the pawl-lever H. The gripping-arm G' projects laterally, and is formed with a hook, $g'$, to engage the felly of the wheel.

An arm, $G^2$, projects from the opposite side, and is formed with an opening, $g^2$, to receive the end of a check-rein, I, which latter passes through a staple secured to the under side of the adjacent shaft, and is adapted to extend between the fore legs of the horse for attachment to the bridle-ring.

The operation of the device thus constructed is as follows: The gripping-arm and pawl-lever are normally held out of contact with the wheel by being secured to the shaft. When it is desired to apply the device, the gripping-arm G' is hooked over the felly and the pawl-lever H engages one of the spokes, the retracting force of the spring $f$ serving to hold the arm G in contact with the wheel.

It will be apparent that when the wheel revolves slightly the checking device will be carried with it, thus imparting strain to the check-rein I and operating to stop the horse.

The modification shown in Fig. 2 shows the spring-rod provided with a knob or handle to facilitate the adjustment of the device, and in this instance the hitch is applied to the top edge of the wheel instead of to the front edge thereof, so that the driver of the vehicle can apply the hitch before leaving his seat.

I do not limit myself to the precise construction herein described, as many minor changes may be resorted to without departing from the spirit of my invention.

Having fully described my invention, what I claim as new, and desire to secure by Letters Patent, is—

1. The combination, with an axle and wheel, of a tube movably secured to said axle, a spring-rod extending through the tube, a bracket on the rod, the gripping device secured to the bracket, a pawl-lever pivoted to said gripping device intermediate of the bracket, and a check-rein, substantially as described.

2. The combination, with an axle and wheel, of the clip secured to the axle, formed with an eye, the tube formed with an arm fitting into said eye and secured by bolts and nuts, a spring and rod extending through said tube and connecting with the axle, the bracket on said rod, the gripping device secured to the bracket, a pawl-lever intermediate of the two latter, and a check-rein, substantially as described.

3. The combination, with the tube and spring-rod and the bracket and gripping device, of a check-rein secured to an arm of the gripping device, and a pawl-lever pivoted between the bracket upon the spring-rod and a lug on the gripping device, substantially as described.

4. The combination, with the axle and wheel, of the clip D, secured to the axle and having the eye, the tube E, formed at one end with an arm fitting in the eye, the spring-rod extending through the tube and connecting with the axle, the bracket J, secured to the rod and formed with openings to receive the same, the gripping device secured to the bracket and having arms G G', the pawl-lever H, and the check-rein, all arranged substantially as described.

In testimony whereof I affix my signature in presence of two witnesses.

DEXTER S. MUNGER.

Witnesses:
WILLIAM C. TROWBRIDGE,
SARAH A. DEAN.